(12) United States Patent
Low

(10) Patent No.: US 12,612,542 B2
(45) Date of Patent: Apr. 28, 2026

(54) REFRIGERANT COMPOSITIONS

(71) Applicant: Mexichem Fluor S.A. de C.V., San Luis Potosi (MX)

(72) Inventor: Robert E. Low, Runcorn (GB)

(73) Assignee: MEXICHEM FLUOR S.A. DE C.V., San Luis Potosi (MX)

( * ) Notice: Subject to any disclaimer, the term of this patent is extended or adjusted under 35 U.S.C. 154(b) by 848 days.

(21) Appl. No.: 17/795,473

(22) PCT Filed: Feb. 12, 2021

(86) PCT No.: PCT/GB2021/050346
§ 371 (c)(1),
(2) Date: Jul. 26, 2022

(87) PCT Pub. No.: WO2021/161035
PCT Pub. Date: Aug. 19, 2021

(65) Prior Publication Data
US 2023/0082725 A1 Mar. 16, 2023

(30) Foreign Application Priority Data
Feb. 14, 2020 (GB) ..................................... 2002048

(51) Int. Cl.
*C09K 5/04* (2006.01)

(52) U.S. Cl.
CPC ........ *C09K 5/045* (2013.01); *C09K 2205/106* (2013.01); *C09K 2205/122* (2013.01); *C09K 2205/126* (2013.01); *C09K 2205/40* (2013.01)

(58) Field of Classification Search
CPC ..................................................... C09K 5/045
See application file for complete search history.

(56) References Cited

U.S. PATENT DOCUMENTS

| | | | |
|---|---|---|---|
| 5,736,063 A | 4/1998 | Richard et al. | |
| 7,238,299 B2 | 7/2007 | Singh et al. | |
| 10,144,855 B2 | 12/2018 | Saito et al. | |
| 2005/0044885 A1 | 3/2005 | Pearson | |
| 2011/0162410 A1 | 7/2011 | Low | |
| 2014/0222699 A1 | 8/2014 | Low | |
| 2015/0315446 A1 | 11/2015 | Yana Motta et al. | |
| 2016/0178246 A1* | 6/2016 | Toyooka | F25B 9/008 62/502 |
| 2016/0187038 A1 | 6/2016 | Toyooka | |
| 2016/0215193 A1 | 7/2016 | Low | |
| 2016/0340565 A1 | 11/2016 | Tasaka et al. | |
| 2018/0320041 A1 | 11/2018 | Zou et al. | |
| 2018/0355269 A1* | 12/2018 | Low | C09K 21/02 |
| 2019/0085224 A1 | 3/2019 | Sethi et al. | |
| 2020/0283666 A1 | 9/2020 | Aydin et al. | |
| 2020/0283667 A1 | 9/2020 | Aydin et al. | |
| 2021/0261840 A1 | 8/2021 | Low | |
| 2021/0403777 A1 | 12/2021 | Low | |
| 2022/0127507 A1 | 4/2022 | Low | |
| 2023/0022894 A1 | 1/2023 | Parrabbi et al. | |
| 2023/0105619 A1 | 4/2023 | Low | |
| 2023/0123381 A1 | 4/2023 | Low | |
| 2024/0247175 A1 | 7/2024 | Rached | |

FOREIGN PATENT DOCUMENTS

| | | | | |
|---|---|---|---|---|
| CN | 101914368 A | 12/2010 | | |
| CN | 103781872 A | 5/2014 | | |
| CN | 105462564 A | 4/2016 | | |
| CN | 108070360 A | 5/2018 | | |
| CN | 108070361 A | 5/2018 | | |
| CN | 109666457 A | 4/2019 | | |
| CN | 111662685 A | 9/2020 | | |
| CN | 112996879 A | 6/2021 | | |
| CN | 113677774 A | 11/2021 | | |
| CN | 114929832 A | 8/2022 | | |
| CN | 116656323 A | 8/2023 | | |
| EP | 0 770 112 B1 | 4/1999 | | |
| EP | 0 770 113 B1 | 4/1999 | | |
| GB | 2480517 A | 11/2011 | | |
| GB | 2576328 A | 2/2020 | | |
| JP | H06-220435 A | 8/1994 | | |
| JP | H08-67870 A | 3/1996 | | |
| JP | 201116822 A | 6/2011 | | |
| JP | 2013-533896 A | 8/2013 | | |
| JP | 2020-143279 A | 9/2020 | | |
| JP | 2020-143280 A | 9/2020 | | |
| WO | WO 96/02606 A1 | 2/1996 | | |
| WO | WO 2015/045355 A1 | 3/2017 | | |
| WO | WO 2017/151488 A1 | 9/2017 | | |
| WO | WO-2018211283 A1 * | 11/2018 | ............. | G06Q 50/26 |
| WO | WO 2019/030508 A1 | 2/2019 | | |
| WO | WO 2019/074734 A1 | 4/2019 | | |
| WO | WO 2019/074735 A1 | 4/2019 | | |

(Continued)

OTHER PUBLICATIONS

Nicola, Giovanni Di, et al., Blends of Carbon Dioxide and HFCs as Working Fluids for the Low-temperature Circuit in Cascade Refrigerating Systems, International Journal of Refrigeration, 28 (2005), pp. 130-140, ScienceDirect.com.

Chinese-language Office Action issued in Chinese Application No. 202180012129.2 dated Dec. 2, 2024, with English translation (25 pages).

Office Action dated Oct. 7, 2024, issued in Japanese Patent Application No. 2022-548253 w/English translation, 13 pages.

Office Action dated Aug. 19, 2024, issued in Chinese Patent Application No. 202180012152.1, w/English translation, 26 pages.

Great Britain Search Report, dated Aug. 17, 2020, pp. 1-5, issued in GB Patent Application No. GB2002063.2, Intellectual Property Office, Newport, South Wales, UK.

(Continued)

*Primary Examiner* — Peter F Godenschwager

(74) *Attorney, Agent, or Firm* — Crowell & Moring LLP

(57) ABSTRACT

According to the present invention, there is provided a composition carbon dioxide ($CO_2$, R-744), difluoromethane (R-32) and 1,1-difluoroethylene (R-1132$a$).

33 Claims, 1 Drawing Sheet

(56) References Cited

FOREIGN PATENT DOCUMENTS

| | | | |
|---|---|---|---|
| WO | WO 2019/099961 A1 | 5/2019 |
| WO | WO 2019/102003 A1 | 5/2019 |
| WO | WO 2019/102008 A1 | 5/2019 |
| WO | WO 2019/117213 A1 | 6/2019 |
| WO | WO 2019/234353 A1 | 12/2019 |
| WO | WO 2019/240205 A1 | 12/2019 |
| WO | WO 2020/017522 A1 | 1/2020 |
| WO | WO 2020/035689 A1 | 2/2020 |
| WO | WO 2020/035690 A1 | 2/2020 |
| WO | WO 2020/165569 A1 | 8/2020 |

OTHER PUBLICATIONS

Adams, R. A. & Stein, F. P., "Vapor-Liquid Equilibria for Carbon Dioxide-Difluoromethane System. Journal of Chemical and Engineering Data," vol. 16, No. 2, pp. 146-149 (1971).

Japanese-language Office Action issued in Japanese Application No. 2022-548564 dated Nov. 20, 2024 with English translation (8 pages).

Office Action dated Oct. 7, 2024, issued in Japanese Patent Application No. 2022-548077, w/English translation, 14 pages.

International Search Report for International application No. PCT/GB2021/050334, mailed May 10, 2021.

International Search Report for International Application No. PCT/GB2021/050346 mailed May 17, 2021.

International Search Report for International Application No. PCT/GB2021/050347 mailed May 20, 2021.

International Search Report for International Application No. PCT/GB2021/050348 mailed May 25, 2021.

Written Opinion of the International Searching Authority for International application No. PCT/GB2021/050334, mailed May 10, 2021.

Written Opinion of the International Searching Authority for International Application No. PCT/GB2021/050346 mailed May 17, 2021.

Written Opinion of the International Searching Authority for International Application No. PCT/GB2021/050347 mailed May 20, 2021.

Written Opinion of the International Searching Authority for International Application No. PCT/GB2021/050348 mailed May 25, 2021.

Office Action issued in counterpart Indian Application No. 202227051965 dated Oct. 23, 2025, with Hindi and English languages (7 pages).

* cited by examiner

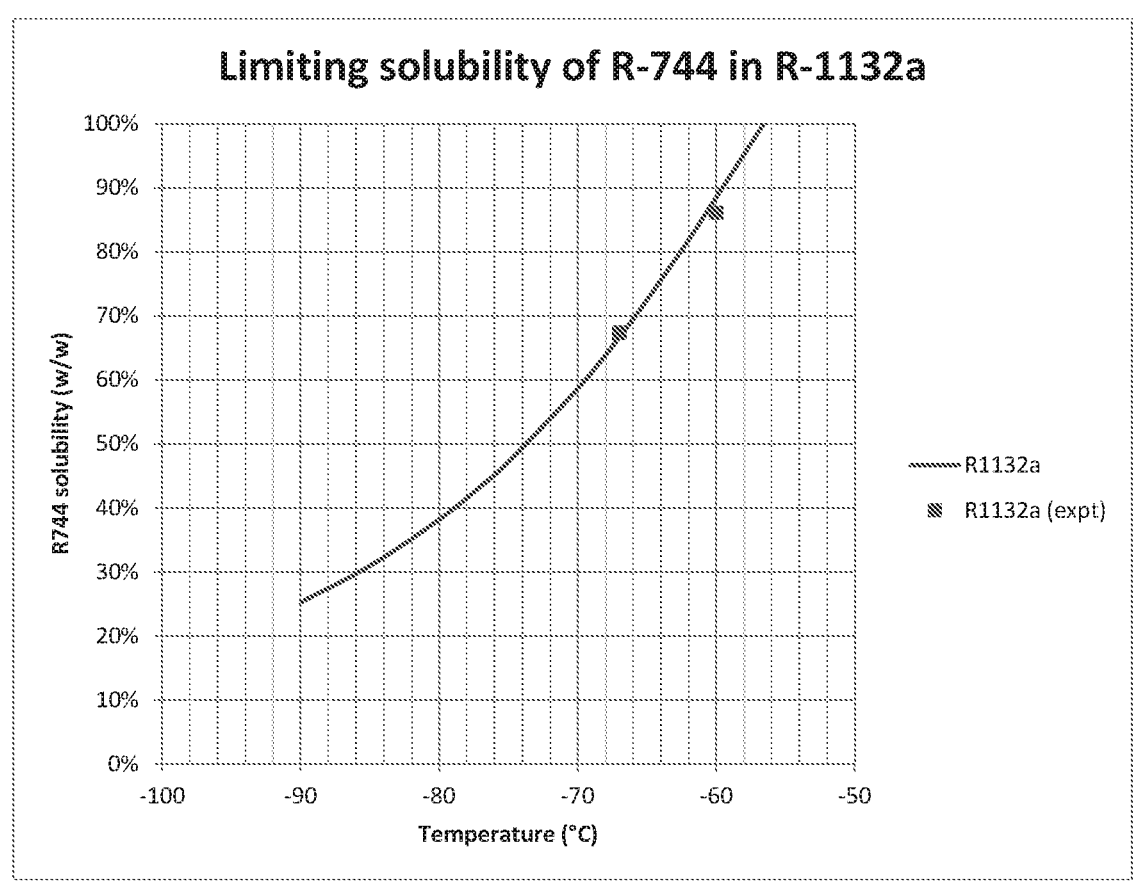
Solubility of solid R-744 in R-1132a

REFRIGERANT COMPOSITIONS

CROSS-REFERENCE TO RELATED APPLICATIONS

This application is the U.S. National Stage application of PCT application no. PCT/GB2021/050346, filed on Feb. 12, 2021, titled COMPOSITIONS, designating the United States, which claims priority to Great Britain application no. 2002048.3, filed on Feb. 14, 2020, the contents of which are each incorporated herein by reference in their entirety.

The present invention relates to compositions, more particularly to refrigerant compositions which are suitable for use as low-temperature refrigerant compositions, especially in the low-temperature stage of a cascade refrigeration system.

The listing or the discussion of a prior-published document or any background in the specification should not necessarily be taken as an acknowledgement that a document or background is part of the state of the art or is common general knowledge.

Refrigeration systems that maintain cold space temperatures of −60° C. or lower have traditionally used non-flammable refrigerants such as R-23 (trifluoromethane) or R-508 (an azeotropic mixture of R-23 with perfluoroethane, R-116) in the bottom stage of a two-stage cascade refrigeration system. In this arrangement, the low temperature refrigerant will evaporate at a low temperature (−50° C. or colder) then be compressed to condense at an intermediate temperature (typically in the range −40° C. to 0° C.) against a second stage refrigerant loop. Both R-23 and R-508 refrigerants have a very high Global Warming Potential (GWP). Accordingly, it is desirable to find alternative refrigerants capable of operating in this temperature range.

Ethane (R-170) is currently used in place of R-508 in certain very low temperature systems, notably laboratory freezers for storage of biomedical materials at a temperature of about −80° C. or colder. However, its extreme flammability precludes its safe use in larger systems, such as those found in low temperature blast freezing systems, climate chamber (wind tunnel) temperature control systems, larger biomedical refrigeration systems, food refrigeration systems and very low temperature refrigerated food transport containers.

Pure $CO_2$ (R-744) has a low GWP and is non-flammable. However, its triple point of −57° C. means that it cannot be used alone in systems that operate below about −55° C. without forming solid dry ice in the low-pressure side of the refrigeration loop.

Binary mixtures of R-744 with several hydrofluorocarbon refrigerants including binary mixtures of R-744 with R-32 have been proposed (di Nicola et al., Int J Refrig 28 (2005) 130-140, the contents of which are incorporated by reference in its entirety) as potential refrigerants suitable for low temperature cascade refrigeration applications. However, the proposed R-744/R-32 mixture (50/50% by mass R-744/ R-32) has a very large "temperature glide" in evaporation and condensation of about 15K. This would make the use of heat exchangers designed for use with a low-glide refrigerant such as R-23 problematic and it would necessitate extensive redesign of the equipment. Furthermore, the compressor discharge temperature of such binary mixtures would be significantly higher than that obtained with R-23 or R-508, again requiring potential redesign. Lastly, the GWP of this mixture would still be relatively high (about 338).

The invention addresses the above deficiencies and the above needs by a provision of a composition comprising carbon dioxide ($CO_2$, R-744), difluoromethane (R-32) and 1,1-difluoroethylene (R-1132a). Such compositions will be referred to hereinafter as "the compositions of the (present) invention".

The present inventor has unexpectedly found that the compositions comprising R-744, R-32 and R-1132a typically have operating characteristics sufficiently similar to R-23 (so that the compositions are suitable for use in the existing heat equipment designs), at the same time having a low GWP (for example below 150), low flammability as compared to R-170, and typically capable of operating well below the triple point of R-744.

In particular, the composition of the invention offer a surprising combination of the desired properties, such as weak flammability, good performance match to R-23 with similar operating pressures, low temperature glides, and compressor discharge temperatures which are within acceptable limits. The compositions of the invention preferably solidify (i.e. form dry ice) at temperatures of below about −70° C. or even below about −75° C. when in operation. Thus, the compositions can be used at operating temperatures below the triple point temperature of $CO_2$ without formation of dry ice in operation.

Furthermore, it has been found that the compositions of the invention are especially suitable for use as an alternative or replacement for existing refrigerants such as R-23 or R-508. The compositions of the invention are particularly advantageous in a low-temperature stage of a cascade refrigeration system. The compositions of the present invention are also suited for use in low temperature blast freezing systems, climate chamber (wind tunnel) temperature control system, biomedical refrigeration systems, food refrigeration systems, very low temperature refrigerated food transport containers and similar heat transfer systems.

The invention will now be described in detail.

According to the invention, there is provided a composition comprising carbon dioxide ($CO_2$, R-744), difluoromethane (R-32) and 1,1-difluoroethylene (R-1132a).

Typically, the compositions of the invention comprise from about 1 to about 40 or about 30 weight % R-32, such as from about 1 to about 25 or about 22 weight %, for example from about 2 or about 3 to about 20 weight %, optionally from about 4 to about 18 or about 20 weight %.

Conveniently, the compositions of the present invention comprise at least about 35 weight $CO_2$, such as at least about 37 or at least about 40 weight %, for example at least about 42 weight % or at least about 45 weight %.

Advantageously, the compositions comprise from about 38 to about 70 weight % $CO_2$, such as from about 40 to about 65 weight %, for example from about 42 to about 62 weight %, optionally from about 44 to about 60 or from about 46 to about 58 weight %.

Conveniently, the compositions comprise at least about 28 weight % R-1132a, such as at least about 30 weight %, for example at least about 32 or at least about 34 weight %, preferably at least about 35 or at least about 37 weight %, optionally at least about 39 or at least about 40 weight %.

Typically, the compositions of the invention comprise from about 29 weight % to about 55 weight % R-1132a, such as from about 31 to about 52 weight %, for example from about 34 to about 49 weight % or from about 35 to about 47 weight %.

Advantageously, the compositions of the invention comprise from about 30 to about 70 weight $CO_2$, from about 1 to about 25 weight % R-32 and from about 28 to about 50 weight % R-1132a, such as from about 35 to about 65 weight % $CO_2$, from about 2 to about 22 weight R-32 and from about 30 to about 48 weight % R-1132a, for example from about 40 to about 60 weight % $CO_2$, from about 3 to about 20 weight % R-32 and from about 32 to about 46 weight % R-1132a.

The compositions of the invention may additionally comprise a further component selected from monofluoromethane (R-41), pentafluoroethane (R-125), trifluoroethylene (R-1123), 1,1,1,2-tetrafluoroethane (R-134a), 1,1-difluoroethane (R-152a), 2,3,3,3-tetrafluoropropene (R-1234yf), trans-1,3,3,3-tetrafluoropropene (R-1234ze(E)) and mixtures thereof. One of the advantages of adding a further component to the compositions is that the further component can help further reduce the solid $CO_2$ onset temperature.

Conveniently, the further component is present in the composition in an amount of from about 1 to about 10 weight %, such as from about 1 to about 8 weight %, for example from about 2 to about 6 weight % or from about 3 to about 5 weight %.

Typically, the further component is selected from R-134a, R-152a, R-1234yf and R-1234ze(E) and mixtures thereof, preferably in an amount of about 1 to about 5 weight %. Conveniently, the further component is R-134a.

In some embodiments, when the further component is R-134a, R-1234yf, R-152a, R-1234ze(E) or mixtures thereof, the further component is present in the compositions of the invention in an amount of less than about 5 weight %.

The compositions of the present invention may additionally comprise one or more hydrocarbons. One of the advantages of including a hydrocarbon in the compositions of the present invention is that it can help with oil return at the low operating temperatures when the compositions are used in heat transfer systems.

For example, the hydrocarbon may be present in the compositions of the present invention in an amount of from about 1 to about 5 weight %, such as from about 1 or about 2 to about 4 weight %.

Conveniently, the hydrocarbon is selected from propane (R-290), isobutane (R-600a), ethane (R-170) and mixtures thereof.

In a preferred embodiment, the compositions of the invention comprise $CO_2$ and R-1132a in a weight ratio of from about 1:1 to about 2.5:1, such as from about 1.05:1 to about 2:1, for example from about 1.1:1 to about 1.6:1.

Accordingly, the compositions of the present invention may comprise from about 2 to about 20 weight % R-32 and from about 80 to about 98 weight % $CO_2$ and R-1132a (optionally from about 4 to about 18 weight % R-32 and from about 82 to about 96 weight % R-1132a and $CO_2$), wherein the weight ratio of $CO_2$ to R-1132a is from about 1:1 to about 2:1, such as from about 1.05:1 to about 2:1, for example from about 1.1:1 to about 1.6:1.

In one embodiment, the compositions are classified as weakly flammable ("class 2L") as determined in accordance with ASHRAE Standard 34:2019. Conveniently, the compositions have a burning velocity of less than about 10 cm/s, such as less than about 9 cm/s, for example less than about 8 cm/s Flammability may be determined in accordance with ASHRAE Standard 34 (e.g. ASHRAE Standard 34:2019) incorporating the ASTM Standard E-681, the entire content of which is incorporated herein by reference.

In one embodiment, the compositions have one or more of (a) a higher lower flammable limit; (b) a higher ignition energy (c) a higher auto-ignition temperature; or (d) a lower burning velocity compared to R-1132a alone.

Preferably, the compositions of the invention are less flammable compared to R-1132a in one or more of the following respects: lower flammable limit at 23° C.; lower flammable limit at 60° C.; breadth of flammable range at 23° C. or 60° C.; auto-ignition temperature (thermal decomposition temperature); minimum ignition energy in dry air or burning velocity. The flammable limits and burning velocity being determined according to the methods specified in ASHRAE-34 and the auto-ignition temperature being determined in a 500 ml glass flask by the method of ASTM E659-78.

The present inventor has found that the compositions of the invention having a mass ratio of R-744 to R-1132a of about 1.1:1 or greater (preferably from about 1.05:1 to about 2:1, for example from about 1.1:1 to about 1.6:1) would have a laminar burning velocity of about 10 cm/s (or less). This is the threshold requirement for classification of a refrigerant as "weakly flammable" (flammability class 2L) by the ASHRAE Standard 34 process.

In one embodiment, the composition may consist essentially of the stated components. By the term "consist essentially of", we include the meaning that the compositions contain substantially no other components, particularly no further (hydro)(fluoro)compounds (e.g. (hydro)(fluoro)alkanes or (hydro)(fluoro)alkenes) known to be used in heat transfer compositions. The term "consist of" is included within the meaning of "consist essentially of".

In an embodiment, the compositions are substantially free of any component that has heat transfer properties (other than the components specified). For instance, the compositions of the invention may be substantially free of any other hydrofluorocarbon compound.

In one embodiment, the compositions of the invention contain substantially no trifluoroiodomethane ($CF_3I$).

In another embodiment, the compositions of the invention contain substantially no trifluoroethylene (R-1123).

By "substantially no" and "substantially free of" we include the meaning that the compositions contain 0.5% by weight or less of the stated component, preferably 0.4%, 0.3%, 0.2%, 0.1% or less, based on the total weight of the compositions.

The compositions of the invention have zero ozone depletion potential.

Conveniently, the compositions of the present invention have a Global Warming Potential (GWP) of less than about 200, such as less than about 170, for example less than about 150 or about 140.

It is believed that the compositions disclosed herein exhibit a completely unexpected combination of low/non-flammability, low GWP, and improved refrigeration performance properties at low temperatures. Some of these properties are explained in more detail below.

Typically, the compositions of the invention have a volumetric cooling capacity which is within about 20% or about 25% of that of R-23, such as within about 15%, for example within about 10%. For instance, the compositions have a volumetric cooling capacity of from about 90 to about 120% of that of R-23.

Conveniently, the compositions have a coefficient of performance (COP) which is within about 10% or 7% of that of R-23, such as within about 5%, for example within about 4%.

Advantageously, the compositions have a temperature glide in a condenser or evaporator which is less than about 15K, such as less than about 12K, for example less than about 10K, preferably less than about 8K.

Typically, the compositions have a compressor discharge temperature which is below about 140° C., such as below about 130° C., for example below about 120° C. or about 110° C.

Conveniently, the compositions have an operating pressure in a condenser which is 2 bar±20% (of the pressure value), such as 2 bar±10%.

Advantageously, the compositions have an operating pressure in an evaporator which is 0.5 bar±20% (of the pressure value), such as 0.5 bar±10%.

Typically, the compositions do not solidify at a temperature of about −70° C. or higher when in operation, such as about −75° C. or higher. This allows the compositions of the invention to operate efficiently in low-temperature heat transfer systems.

Preferably, the compositions have a pressure ratio over a compressor which is within about 20% of that of R-23, such as within about 10%.

In another aspect of the invention, there is provided a use of the composition of the present invention as a working fluid in a heat transfer system.

Conveniently, the heat transfer system is a refrigeration system, such as a cascade refrigeration system.

Advantageously, the heat transfer system is selected from low-temperature blast freezing systems, climate chamber (e.g. wind tunnel) temperature control systems, biomedical refrigeration systems, food refrigeration systems, and low-temperature refrigerated food transport containers.

In a further aspect of the invention, there is provided a use of a composition of the present invention as an alternative for an existing working fluid in a heat transfer system. Typically, the existing working fluid is R-23 or R-508.

In another aspect of the invention, there is provided a heat transfer system comprising a composition of the present invention. Conveniently, the heat transfer system is a (low temperature) refrigeration system, such as a cascade refrigeration system.

Typically, the heat transfer system is selected from low-temperature blast freezing systems, climate chamber (e.g. wind tunnel) temperature control systems, biomedical refrigeration systems, food refrigeration systems, and low-temperature refrigerated food transport containers.

According to a further aspect, there is provided method of producing cooling which comprises evaporating a composition of the present invention in the vicinity of a body to be cooled.

In another aspect of the present invention, there is provided a method of producing heating which comprises condensing or cooling a composition of the present invention in the vicinity of a body to be heated.

As used herein, all % amounts mentioned in the compositions herein, including in the claims, are by weight based on the total weight of the composition, unless otherwise stated.

By the term "about", as used in connection with numerical values of amounts of component in % by weight, we include the meaning of ±0.5 weight %, for example ±0.2 weight %.

For the avoidance of doubt, it is to be understood that the stated upper and lower values for ranges of the amounts of components in the compositions disclosed herein may be interchanged in any way, provided that the resulting ranges fall within the broadest scope of the invention.

The compositions may be prepared by simply mixing the $CO_2$, R-32 and R-1132a and the optional components, such as the further component (e.g. R-134a) and/or a lubricant.

All of the chemicals described herein are commercially available. For example, the fluorochemicals may be obtained from Apollo Scientific (UK).

The present invention is demonstrated in the following non-limiting examples.

EXAMPLES

The laminar burning velocity of mixtures of R-1132a with R-744 was tested using the vertical tube method of Jabbour as referenced by ASHRAE Standard 34. The laminar burning velocity of R-32 is 6.7 cm/s and the compositions of the present invention are anticipated to have an overall burning velocity of less than 10 cm/s.

The binary vapour-liquid equilibrium of R-1132a with R-744 and R-1132a with R-32 was studied in a constant-volume cell in the temperature range −70° C. to 10° C. The general experimental method consisted of the measurement of vapour pressure of known binary mixture compositions over the temperature range to yield a pressure-temperature-composition data set. The data were then regressed to a thermodynamic model capable of representing vapour-liquid equilibrium and also solid-liquid equilibrium. The model used was the Peng-Robinson equation of state using the mixing rules of Wong and Sandler, with liquid phase free energy being correlated to the NRTL model (Referred to hereafter as PRWS/NRTL model). At temperatures below the triple point of R-744, the formation of solid $CO_2$ was observed at high $CO_2$ concentrations in the binary R-1132a/$CO_2$ system. The Schroeder equation was used with the NRTL equation parameters fitted to VLE data to predict the liquid composition in equilibrium with solid $CO_2$ at these temperatures. It was found to give excellent agreement with experiment with the observed onset of solid formation as shown in FIG. 1.

The vapour-liquid equilibrium data available in the literature for R-744 with R-32 were fitted to the same PRWS/NRTL model and the resulting NRTL parameters were then used to provide an estimate of the solubility of solid R-744 in the fluorocarbon mixtures at temperatures below the triple point of R-744.

Next, a thermodynamic cycle model was constructed in the Matlab programming environment using standard cycle modelling techniques. The model used the PRWS/NRTL framework with additional code to estimate the temperature for onset of solid R-744 formation for each composition studied. The compositions were modelled in comparison to R-23 as a reference fluid.

Table 1 shows the cycle conditions chosen, which are thought to be representative of the operating conditions in the low temperature stage of a very low temperature refrigerated food transportation system.

TABLE 1

| Cycle modelling conditions | | |
| --- | --- | --- |
| Parameter | Units | Value |
| Evaporator temperature | ° C. | −70 |
| Condenser temperature | ° C. | −30 |
| Subcooling | K. | 5 |
| Evaporator superheat | K. | 5 |
| Suction line superheat | K. | 30 |
| compressor efficiency | % | 65% |
| compressor clearance ratio | % | 3% |

The performance of selected compositions of the invention are shown in Tables 2 and 3 below with R-23 as the reference fluid. Table 4 demonstrates the estimated solid formation temperature of the compositions of the present invention further comprising R-134a.

From the performance data, it can be seen that the performance of the compositions of the invention is acceptably close to that of R-23. For example, the compositions of the invention preferably exhibit one or more of the following performance properties:

Volumetric cooling capacity from about 90% to 120% of that of R-23

Coefficient of performance (energy efficiency) within about 5% of that of R-23

Temperature glide of about 10K or less

Compressor discharge temperatures of below about 130° C.

Similar pressure ratio over compressor as R-23 (which translates into similar volumetric efficiency)

Operating pressures of about 2 bar on condenser and about 0.5 bar on evaporator

Solid formation temperature of below about −70° C.

Global Warming Potential below 150

It can also be seen from the performance data that reducing the weight ratio of R-744 to R-1132a increases burning velocity but reduces glide, discharge temperature and solid dry ice onset temperature.

TABLE 2

| Compositions shown in mass % - anticipated to have burning velocity similar to that of R-32 | | | | | | | | | |
|---|---|---|---|---|---|---|---|---|---|
| R-744 | 57 | 56 | 55 | 54 | 53 | 52 | 50 | 49 | 48 |
| R-1132a | 39 | 38 | 37 | 36 | 35 | 34 | 34 | 33 | 32 |
| R-32 | 4 | 6 | 8 | 10 | 12 | 14 | 16 | 18 | 20 |

| Parameter | Unit | | | | | | | | | |
|---|---|---|---|---|---|---|---|---|---|---|
| Volumetric Cooling Capacity | kJ/m$^3$ | 1655 | 1578 | 1510 | 1448 | 1393 | 1349 | 1294 | 1252 | 1216 |
| Capacity relative to R-23 | | 124.4% | 118.6% | 113.5% | 108.9% | 104.8% | 101.4% | 97.3% | 94.1% | 91.4% |
| Coefficient of Performance (COP) | | 2.29 | 2.27 | 2.25 | 2.24 | 2.23 | 2.23 | 2.23 | 2.24 | 2.24 |
| COP relative to R-23 | | 96.9% | 96.0% | 95.4% | 95.0% | 94.7% | 94.4% | 94.7% | 94.8% | 95.0% |
| Average temperature glide | K | 2.8 | 3.9 | 5.0 | 6.0 | 7.0 | 8.0 | 8.7 | 9.4 | 10.1 |
| Compressor exit temperature | ° C. | 98.7 | 102.0 | 105.1 | 107.8 | 110.3 | 114.1 | 113.6 | 115.4 | 116.4 |
| Condenser pressure | bar | 12.7 | 12.3 | 11.9 | 11.5 | 11.2 | 10.9 | 10.5 | 10.2 | 9.9 |
| Evaporator pressure | bar | 2.46 | 2.32 | 2.20 | 2.09 | 1.99 | 1.90 | 1.81 | 1.74 | 1.67 |
| Pressure ratio | | 5.2 | 5.3 | 5.4 | 5.5 | 5.6 | 5.7 | 5.8 | 5.9 | 5.9 |
| GWP | | 28 | 42 | 55 | 69 | 82 | 96 | 109 | 123 | 136 |
| Estimated solid formation temperature | ° C. | −70.9 | −71.9 | −72.8 | −73.8 | −74.8 | −75.7 | −77.2 | −78.2 | −79.2 |

TABLE 3

| Compositions shown in mass % - anticipated to have burning velocity of 9 cm/s | | | | | | | | | |
|---|---|---|---|---|---|---|---|---|---|
| R744 | 51 | 50 | 49 | 48 | 46 | 45 | 44 | 43 | 41 |
| R1132a | 45 | 44 | 43 | 42 | 42 | 41 | 40 | 39 | 39 |
| R32 | 4 | 6 | 8 | 10 | 12 | 14 | 16 | 18 | 20 |

| Parameter | Unit | | | | | | | | | |
|---|---|---|---|---|---|---|---|---|---|---|
| Volumetric Cooling Capacity | kJ/m$^3$ | 1631 | 1558 | 1491 | 1430 | 1372 | 1323 | 1278 | 1236 | 1194 |
| Capacity relative to R-23 | | 122.6% | 117.1% | 112.1% | 107.5% | 103.1% | 99.5% | 96.0% | 92.9% | 89.7% |
| Coefficient of Performance (COP) | | 2.30 | 2.28 | 2.26 | 2.25 | 2.25 | 2.24 | 2.24 | 2.25 | 2.25 |
| COP relative to R-23 | | 97.4% | 96.5% | 95.8% | 95.4% | 95.3% | 95.0% | 95.0% | 95.2% | 95.4% |
| Average temperature glide | K | 2.8 | 3.9 | 4.9 | 5.8 | 6.7 | 7.7 | 8.5 | 9.2 | 9.8 |
| Compressor exit temperature | ° C. | 94.5 | 97.9 | 100.9 | 103.4 | 105.1 | 107.5 | 109.4 | 111.1 | 111.8 |
| Condenser pressure | bar | 12.4 | 12.1 | 11.7 | 11.3 | 11.0 | 10.7 | 10.4 | 10.0 | 9.7 |
| Evaporator pressure | bar | 2.43 | 2.30 | 2.18 | 2.07 | 1.97 | 1.88 | 1.79 | 1.72 | 1.65 |
| Pressure ratio | | 5.1 | 5.3 | 5.4 | 5.5 | 5.6 | 5.7 | 5.8 | 5.8 | 5.9 |
| GWP | | 28 | 42 | 55 | 69 | 82 | 96 | 109 | 123 | 136 |
| Estimated solid formation temperature | ° C. | −73.3 | −74.4 | −75.5 | −76.6 | −78.2 | −79.3 | −80.4 | −81.6 | −83.3 |

TABLE 4

| effect of adding 10% R-134a to compositions of Table 3 to solid onset temperature Compositions shown in mass % - anticipated to have burning velocity similar to that of R-32 | | | | | | | | | |
|---|---|---|---|---|---|---|---|---|---|
| R-744 | 51 | 50 | 50 | 49 | 48 | 47 | 45 | 44 | 43 |
| R-1132a | 35 | 34 | 33 | 32 | 32 | 31 | 31 | 30 | 29 |
| R-32 | 4 | 5 | 7 | 9 | 11 | 13 | 14 | 16 | 18 |
| R-134a | 10 | 10 | 10 | 10 | 10 | 10 | 10 | 10 | 10 |

| Parameter | Unit | | | | | | | | | |
|---|---|---|---|---|---|---|---|---|---|---|
| Estimated solid formation temperature | ° C. | −73.0 | −73.9 | −74.9 | −75.8 | −76.8 | −77.7 | −79.2 | −80.2 | −81.1 |

The invention claimed is:

1. A composition comprising:
   (a) at least about 35 weight % carbon dioxide ($CO_2$, R-744);
   (b) from about 1 to about 30 weight % difluoromethane (R-32); and
   (c) from about 28 to about 55 weight % 1,1-difluoroethylene (R-1132a).

2. The composition according to claim 1 comprising from about 1 to about 25 or about 22 weight % R-32, from about 2 or about 3 to about 20 weight %, or from about 4 to about 18 or about 20 weight %.

3. The composition according to claim 1 comprising at least about 37 weight % $CO_2$, at least about 40 weight %, at least about 42 weight % or at least about 45 weight %.

4. The composition according to claim 1 comprising at least about 30 weight % R-1132a, at least about 32 weight %, at least about 34 weight %, at least about 35 weight %, at least about 37 weight %, at least about 39 weight %, or at least about 40 weight %.

5. The composition according to claim 1 comprising from about 38 to about 70 weight % $CO_2$, from about 40 to about 65 weight %, from about 42 to about 62 weight %, from about 44 to about 60 weight %, or from about 46 to about 58 weight %.

6. The composition according to claim 1 comprising from about 29 weight % to about 55 weight % R-1132a, from about 31 to about 52 weight %, from about 34 to about 49 weight % or from about 35 to about 47 weight %.

7. The composition according to claim 1 comprising from about 35 to about 70 weight % $CO_2$, from about 1 to about 25 weight % R-32 and from about 28 to about 50 weight % R-1132a, from about 35 to about 65 weight % $CO_2$, from about 2 to about 22 weight % R-32 and from about 30 to about 48 weight % R-1132a, or from about 40 to about 60 weight % $CO_2$, from about 3 to about 20 weight % R-32 and from about 32 to about 46 weight % R-1132a.

8. The composition according to claim 1, wherein the composition additionally comprises a further component selected from monofluoromethane (R-41), pentafluoroethane (R-125), trifluoroethylene (R-1123), 1,1,1,2-tetrafluoroethane (R-134a), 1,1-difluoroethane (R-152a), 2,3,3,3-tetrafluoropropene (R-1234yf), trans-1,3,3,3-tetrafluoropropene (R-1234ze (E)) and mixtures thereof.

9. The composition according to claim 8, wherein the further component is present in the composition in an amount of from about 1 to about 10 weight %, from about 1 to about 8 weight %, from about 2 to about 6 weight % or from about 3 to about 5 weight %.

10. The composition according to claim 8 wherein the further component is selected from R-134a, R-152a, R-1234yf and R-1234ze (E) and mixtures thereof, or wherein the further component is present in an amount of from about 1 to about 5 weight %, optionally wherein the further component is R-134a.

11. The composition according to claim 1, wherein the composition additionally comprises a hydrocarbon.

12. The composition according to claim 11, wherein the hydrocarbon is present in an amount of from about 1 to about 5 weight %, or from about 1 or about 2 to about 4 weight %.

13. The composition according to claim 11, wherein the hydrocarbon is selected from propane (R-290), isobutane (R-600a), ethane (R-170) and mixtures thereof.

14. The composition according to claim 1 comprising the $CO_2$ and the R-1132a in a weight ratio of from about 1:1 to about 2.5:1, from about 1.05:1 to about 2:1, or from about 1.1:1 to about 1.6:1.

15. The composition according to claim 1 consisting essentially of the stated components.

16. The composition according to claim 1, wherein the composition is classified as weakly flammable ("class 2L") as determined in accordance with ASHRAE Standard 34:2019, and/or wherein the composition has a burning velocity of less than about 10 cm/s, less than about 9 cm/s, or less than about 8 cm/s.

17. The composition according to claim 1, wherein the composition has a Global Warming Potential (GWP) of less than about 200, less than about 170, or less than about 150.

18. The composition according to claim 1, wherein the composition has a volumetric cooling capacity which is within about 25% of that of R-23, within about 20%, within about 15%, or within about 10%.

19. The composition according to claim 1, wherein the composition has a coefficient of performance (COP) which is within about 10% of that of R-23, within about 7%, or within about 5%.

20. The composition according to claim 1, wherein the composition has a temperature glide in a condenser or evaporator which is less than about 15K, less than about 12K, less than about 10K, or less than about 8K.

21. The composition according to claim 1, wherein the composition has a compressor discharge temperature which is below about 140° C., below about 130° C., below about 120° C., or below about 110° C.

22. The composition according to claim 1, wherein the composition has an operating pressure in a condenser which is 2 bar±20%, or 2 bar±10%.

23. The composition according to claim 1, wherein the composition has an operating pressure in an evaporator which is 0.5 bar±20%, or 0.5 bar±10%.

24. The composition according to claim 1, wherein the composition does not solidify at a temperature of about −70° C. or higher when in operation, or about −75° C. or higher.

25. The composition according to claim 1, wherein the composition has a pressure ratio over a compressor which is within about 20% of that of R-23, or within about 10%.

26. A heat transfer system comprising a composition as defined in claim 1.

27. The heat transfer system according to claim 26, wherein the heat transfer is selected from low-temperature blast freezing systems, climate chamber temperature control systems, biomedical refrigeration systems, food refrigeration systems, and low-temperature refrigerated food transport containers.

28. A method comprising providing a composition according to claim 1 as a working fluid in a heat transfer system.

29. The method of claim 28, wherein the heat transfer system is a refrigeration system, optionally comprising a cascade refrigeration system.

30. The method of claim 28, wherein the heat transfer system is selected from low-temperature blast freezing systems, climate chamber temperature control systems, biomedical refrigeration systems, food refrigeration systems, or low-temperature refrigerated food transport containers.

31. A method comprising providing a composition as defined in claim 1 as an alternative for an existing working fluid in a heat transfer system, optionally wherein the existing working fluid is R-23 or R-508.

32. A method of producing cooling which comprises evaporating a composition according to claim 1 in the vicinity of a body to be cooled.

33. A method of producing heating which comprises condensing or cooling a composition according to claim 1 in the vicinity of a body to be heated.

\* \* \* \* \*